US012799751B2

(12) United States Patent
Wiese

(10) Patent No.: US 12,799,751 B2
(45) Date of Patent: Nov. 17, 2026

(54) PEDESTRIAN SUPPORT FOR GENERATOR

(71) Applicant: Kohler Co., Kohler, WI (US)

(72) Inventor: Aaron Wiese, Cascade, WI (US)

(73) Assignee: DISCOVERY ENERGY, LLC, Kohler, WI (US)

( * ) Notice: Subject to any disclaimer, the term of this patent is extended or adjusted under 35 U.S.C. 154(b) by 21 days.

(21) Appl. No.: 18/212,360

(22) Filed: Jun. 21, 2023

(65) Prior Publication Data

US 2023/0417177 A1 Dec. 28, 2023

Related U.S. Application Data

(60) Provisional application No. 63/356,414, filed on Jun. 28, 2022.

(51) Int. Cl.
*E04G 1/15* (2006.01)
*F02B 63/04* (2006.01)

(52) U.S. Cl.
CPC ............ *E04G 1/152* (2013.01); *F02B 63/044* (2013.01); *F02B 2063/045* (2013.01)

(58) Field of Classification Search
CPC ... E04G 1/152; F02B 63/044; F02B 2063/045
USPC .......................................................... 182/222
See application file for complete search history.

(56) References Cited

U.S. PATENT DOCUMENTS

| | | | | |
|---|---|---|---|---|
| 4,871,922 | A | 10/1989 | Heinrich et al. | |
| 6,100,599 | A | 8/2000 | Kouchi et al. | |
| 6,750,556 | B2 | 6/2004 | Sodemann et al. | |
| 7,543,793 | B2 | 6/2009 | Graham et al. | |
| 7,795,745 | B2 | 9/2010 | Mellon et al. | |
| 8,427,005 | B1 | 4/2013 | Kisner et al. | |
| 9,371,953 | B2 | 6/2016 | Spratt et al. | |
| 9,431,865 | B2 | 8/2016 | Janscha et al. | |
| 10,340,696 | B2 | 7/2019 | Paine et al. | |
| 10,340,697 | B2 | 7/2019 | Paine et al. | |
| 10,637,250 | B2 | 4/2020 | Paine et al. | |
| 10,876,471 | B2 | 12/2020 | Goleczka et al. | |
| 10,989,361 | B2 | 4/2021 | Beaulieu | |
| 2020/0011484 | A1 * | 1/2020 | Beaulieu | F17C 13/04 |
| 2022/0098886 | A1 * | 3/2022 | More | E04H 5/02 |

FOREIGN PATENT DOCUMENTS

| | | | |
|---|---|---|---|
| WO | 2020247842 | A1 | 12/2020 |

* cited by examiner

*Primary Examiner* — Lindsay M Low
*Assistant Examiner* — Omar Morales
(74) *Attorney, Agent, or Firm* — The Belles Group, P.C.

(57) ABSTRACT

Provided is a pedestrian support for a generator enclosure including a body configured to support a pedestrian and provide access to a generator enclosure, the body having a first end and a second end, a first bearing plate configured to support the body at the first end, and a second bearing plate configured to support the body disposed at the second end.

19 Claims, 7 Drawing Sheets

PEDESTRIAN SUPPORT FOR GENERATOR

This application claims priority benefit of Provisional Application No. 63/356,414 filed Jun. 28, 2022, which is hereby incorporated by reference in its entirety.

FIELD

The present disclosure relates to a generator enclosure. More specifically, the present disclosure relates to a generator enclosure having improved accessibility and/or adaptability.

BACKGROUND

A generator or genset (i.e., an engine and an alternator) is often provided inside of a generator enclosure. The generator enclosure may protect the generator and increase the number of locations in which the generator may be installed. For example, the generator enclosure may allow the generator to be installed outside. In some circumstances, a generator may be installed on a plurality of beams. For example, the generator may be installed on a plurality of beams spanning across a fuel tank for storing fuel for the generator. Additionally, in some examples, a generator enclosure may include a portion or compartment including one or more sound suppression elements.

BRIEF DESCRIPTION OF THE DRAWINGS

Exemplary embodiments of the present disclosure are described herein with reference to the following drawings, according to an exemplary embodiment.

DETAILED DESCRIPTION

Before turning to the figures, which illustrate certain exemplary embodiments in detail, it should be understood that the present disclosure is not limited to the details and methodology set forth in the detailed description or illustrated in the figures. It should be understood that the terminology used herein is for the purpose of description only and should not be regarded as limiting.

Described herein are devices and systems for providing access to a generator enclosure, generator enclosures including devices for improving enclosure accessibility, and a generator enclosure including a primary compartment and an expansion compartment. The devices and systems for providing access to a generator described herein include, without limitation, pedestrian supports and generator enclosure assemblies including a pedestrian support. In some examples, the pedestrian support may include a body, on which a user may stand, and two bearing plates (e.g., a first bearing plate and a second bearing plate). One bearing plate may be disposed at each end of the body and each of the bearing plates may be attached to a beam. The beams may structurally support the pedestrian support.

In some examples, in order to conserve space, the generator (i.e., generator enclosure) may be installed on a fuel tank storing fuel for the generator. Two or more beams located above the fuel tank may span across the fuel tank and support the generator. In some circumstances, the fuel tank may have a larger footprint than (i.e., have a larger width and/or length than) the generator. Accordingly, there may be a distance between a perimeter of the fuel tank and a perimeter of the generator enclosure. The pedestrian supports and the generator enclosure assemblies described herein may provide a walkable surface between the perimeter of the fuel tank and a perimeter of the generator enclosure configured to support a pedestrian and provide access to the generator.

Described herein is a generator enclosure including a primary compartment and an expansion box. The primary compartment may include a genset (i.e., an engine and an alternator) and the expansion box may include an air intake pipe, an air discharge pipe, sound baffles and acoustic foam. The primary compartment includes a top panel opening and an install guide disposed around a portion of the top panel opening. The expansion box includes a bottom opening configured to receive the install guides and a plurality of mounting holes configured to receive a fastener for securing the expansion box to the install guide. The generator enclosure described herein may provide for safe installation (e.g., attachment, securing) of the expansion box to the primary compartment. For example, the expansion box may be attached to the primary compartment from outside the primary compartment and the expansion box.

Figure 1:
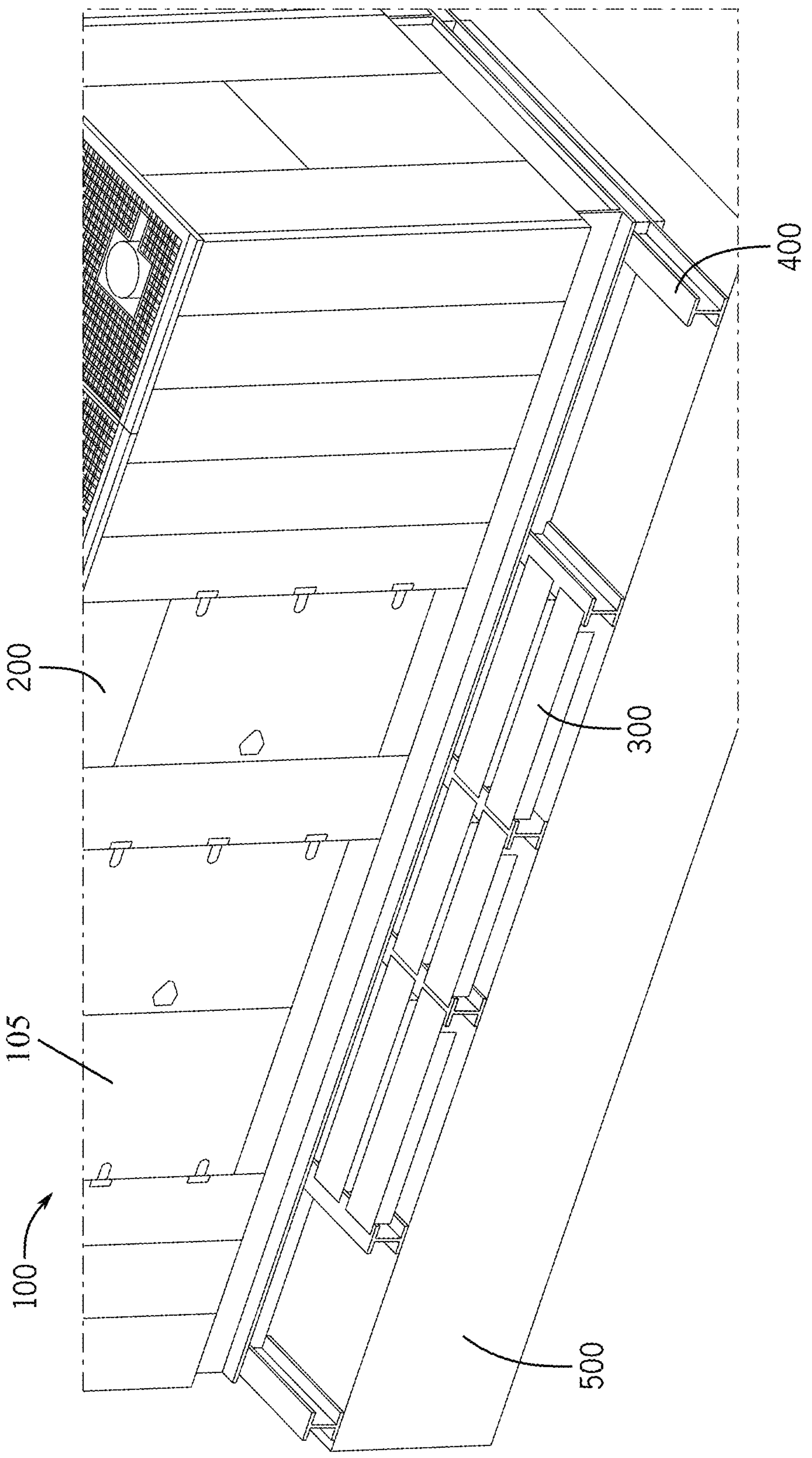
FIG. 1 illustrates a perspective view of a generator enclosure assembly according to an exemplary embodiment of the present disclosure.
Figure 6:
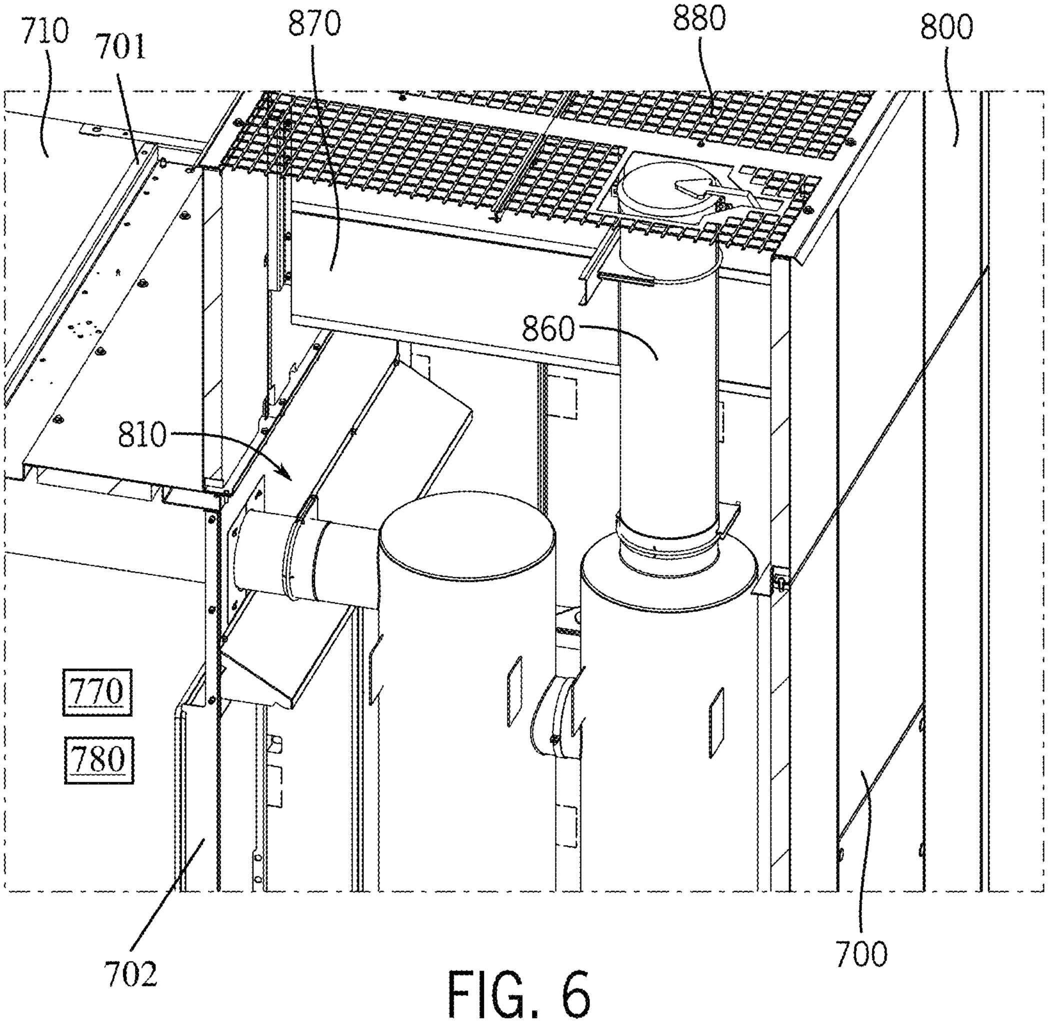
FIG. 6 illustrates a partial cross section view of a primary compartment and an expansion box according to an exemplary embodiment of the present disclosure.

FIG. 1 illustrates a perspective view of a generator enclosure assembly 100 according to an exemplary embodiment of the present disclosure. The generator enclosure assembly 100 includes a generator enclosure 200, a pedestrian support 300, and two or more beams 400. The generator enclosure assembly 100 may further include a fuel tank 500. The generator enclosure 200 may include a genset (i.e., an engine 770 and an alternator 780) as shown in FIG. 6. The genset may be disposed inside the generator enclosure 200. In some examples, the genset may be coupled to the two or more beams 400.

The two or more beams 400 may be disposed below the generator enclosure 200 and support the generator enclosure 200. The two or more beams 400 may be comprised of a metal or a metal alloy. For example, the two or more beams 400 may be comprised of steel, cast iron, aluminum alloy, or the like. The shape of the two or more beams may vary. In some examples, the two or more beams may be I-beams. In other examples, the two or more beams may be wide flange, C-channel, hollowed structural section (HSS), or the like.

The pedestrian support 300 may be support by the two or more beams 400. For example, one of the two or more beams (i.e., a first beam) may support one side (i.e., a first end) of the pedestrian support 300 and another of the two or more beams (i.e., a second beam) may support another side (i.e., a second end) of the pedestrian support 300. The pedestrian support 300 may be supported by the two or more beams 400 so as to be perpendicular, or substantially perpendicular, to each of the two or more beams 400. The pedestrian support 300 may be configured to provide a walkable surface to support a user and to provide access to the generator enclosure 200.

In some examples, as illustrated in FIG. 1, a generator enclosure 100 may include a plurality of pedestrian supports 300. In some examples, the generator enclosure 100 may include two or more pedestrian supports disposed between the same pair of two or more beams 400. In other examples, the generator enclosure 100 may include two or more pedestrian supports 300 disposed between different pairs of two or more beams 400. When two or more pedestrian supports are adjacent to one another, a single one of the two or more beams 400 may support two or more pedestrian supports on opposites sides of the beam.

In some examples, the generator enclosure assembly 100 may further include a fuel tank 500. The two or more beams 400 may span across the fuel tank 500. The two or more beams 400 may be integrally formed with the fuel tank 500 or may be separate, individual components. In some examples, the fuel tank 500 may support the two or more beams 400 and the generator enclosure 200. The fuel tank 500 may store fuel for the genset disposed in the generator enclosure 200.

Figure 2:
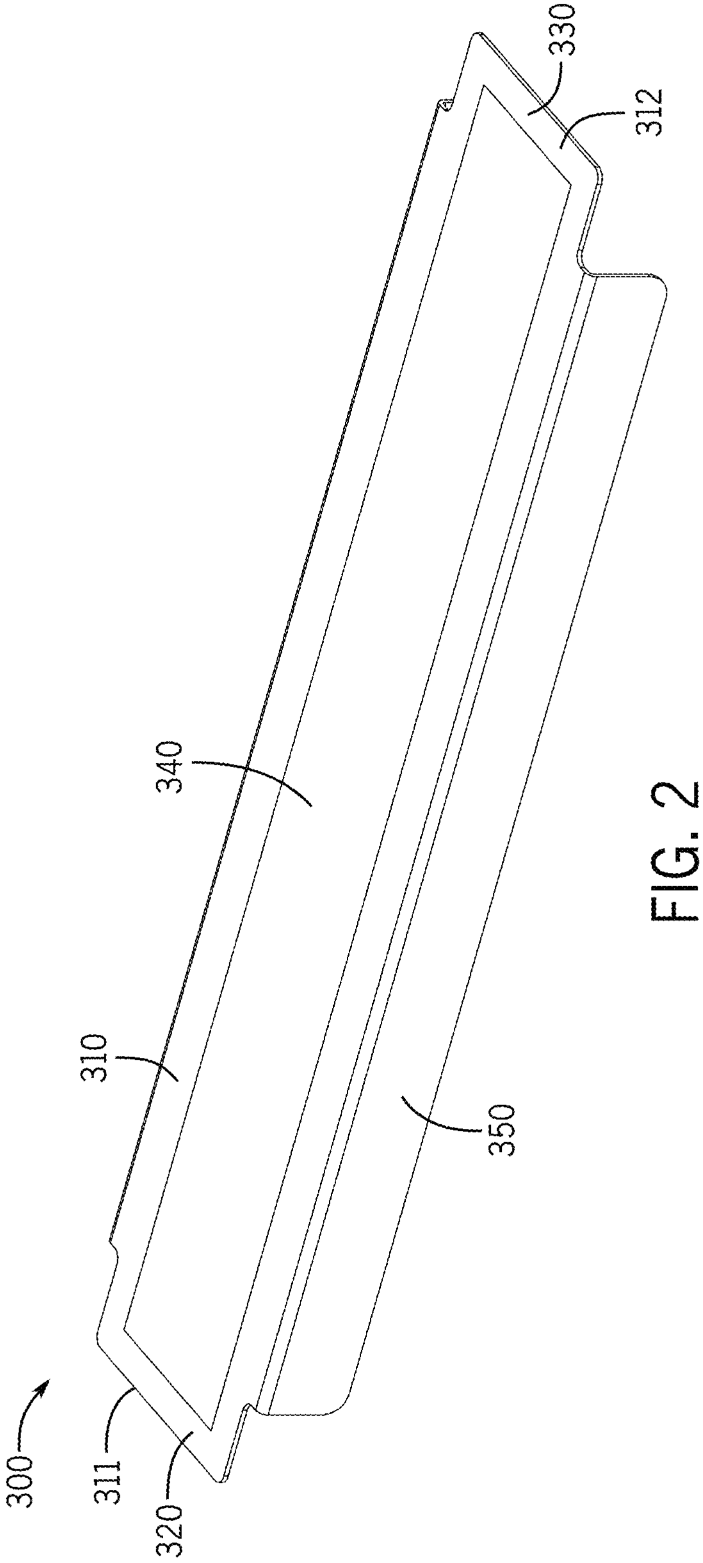
FIG. 2 illustrates a perspective view of a pedestrian support according to an exemplary embodiment of the preset disclosure.

FIG. 2 illustrates a perspective view of a pedestrian support 300 according to an exemplary embodiment of the present disclosure. The pedestrian support 300 includes a body 310, a first bearing plate 320, and a second bearing plate 330. The pedestrian support 300 may further include a textured surface 340 and one or more sidewalls 350.

The body 310 of the pedestrian support 300 is configured to support a pedestrian and provide access to a generator enclosure. Specifically, one or more pedestrian supports may be provided adjacent to a door or doors 105 of the generator enclosure, and the body 310 may be configured to support a user that is accessing the door 105. The body 310 extends from a first end 311 to a second end 312. The first bearing plate 320 of the pedestrian support 300 may be disposed at the first end 311 of the body 310. The second bearing plate 330 of the pedestrian support 300 may be disposed at the second end 312 of the body 310. In some examples, the body 310, first bearing plate 320, and second bearing plate 330 may be integrally formed. The body 310, first bearing plate 320, and/or second bearing plate 330 may be comprised of a metal or a metal alloy. For example, the body 310, first bearing plate 320, and second bearing plate 330 may be comprised of cast iron, aluminum alloy, steel, or the like.

The first bearing plate 320 may be configured to be attached to a first beam disposed below a generator enclosure and the second bearing plate 330 may be configured to be attached to a second beam disposed below a generator enclosure. For example, the first bearing plate 320 may be configured to be attached to a top flange of the first beam and the second bearing plate 330 may be configured to be attached to a top flange of the second beam. The first bearing plate 320 and the second bearing plate 330 may be attached to the first beam and the second beam such that a bottom surface of the first bearing plate 320 and a bottom surface of the second bearing plate 330, respectively are attached to the first beam and the second beam.

In some examples, the first bearing plate 320 and the second bearing plate 330 may be configured to be attached to a top flange of the first beam and a top flange of the second beam, respectively, using adhesive tape (i.e., acrylic adhesive, or VHB tape). In other examples, the first bearing plate 320 and the second bearing plate 330 may be configured to be attached to a top flange of the first beam and a top flange of the second beam, respectively, using one or more fasteners. For example, the first bearing plate 320 and the second bearing plate 330 may be attached to the first beam and the second beam using one or more bolts, rivets, or the like. In some examples, the top flange of the first beam and the top flange of the second beam may include one or more threaded holes configured to receive a fastener. In other examples, one or more weld nuts may be used to secure the first bearing plate 320 and the second bearing plate 330, respectively, to the tope flange of the first beam and the top flange of the second beam. In other examples, the first bearing plate 320 and the second bearing plate 330 may be configured to be welded to a top flange of the first beam and a top flange of the second beam, respectively.

In some examples, the first bearing plate 320 and the second bearing plate 330 may be configured to be attached to a web of the first beam and the second beam respectively. For example, the first bearing plate 320 and the second bearing plate 330 may extend into a channel or opening formed in the first beam and the second beam, respectively.

In some examples, the pedestrian support 300 further includes a textured surface 340. In some examples, the textured surface 340 may be formed on the body 310 of the pedestrian support 300 using a metal press and/or scoring a surface of the body 310. In other examples, the textured surface 340 may be provided in a separate component coupled (e.g., with an adhesive) to the body 310. The textured surface may be an anti-slip surface disposed on the body 310 of the pedestrian support 300. The textured surface 340 may be configured to improve the grip (e.g., increase friction) on the body 310 and reduce the likelihood of a pedestrian slipping on the pedestrian support 300. In some examples, the pedestrian support 300 may further include one or more sidewalls 350 extending downward from the body 310. Each of the one or more sidewalls 350 may extend downward from a side or edge of the body 310 between the first end 311 and the second end 312 of the body 310. The one or more sidewalls 350 may improve visibility of the pedestrian support and/or reduce the risk of injury if a side of the pedestrian support is inadvertently run into.

Figure 3:
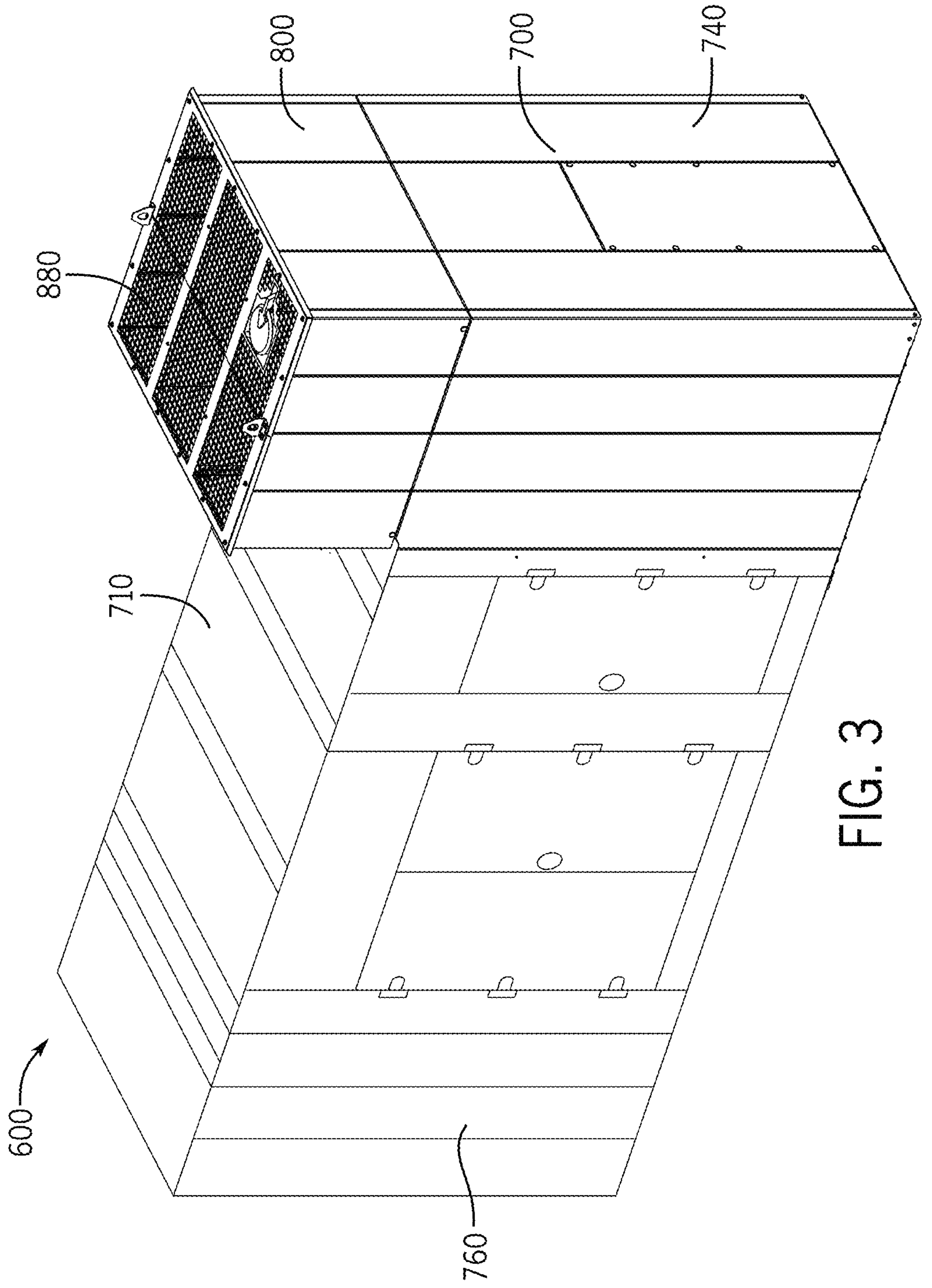
FIG. 3 illustrates a perspective view of a generator enclosure according to an exemplary embodiment of the present disclosure.

Referring to FIGS. 3-6 a generator enclosure 600 according to an exemplary embodiment of the present disclosure is shown. The generator enclosure 600 includes a primary compartment 700 and an expansion box 800. FIG. 3 illustrates a perspective view of a generator enclosure 600 including an expansion box 800 coupled to a primary compartment 700.

The primary compartment 700 may have the shape of a rectangular prism or a substantially rectangular prism and include a genset (i.e., an engine and an alternator). The primary compartment 700 includes an outer surface 760. The outer surface 760 is comprised with a plurality side panels 740. The side panels 740 may be comprised of a sheet of metal or metal alloy. For example, the side panels 740 may be comprised of an aluminum sheet. The primary compartment 700 may further include a plurality of beams or joists 701 and columns 702 comprising the structure or frame of the primary compartment 700 (See FIG. 6). The joists 701 and columns 702 may be comprised of hollow structural section (HSS) (e.g., rectangular HSS, square HSS, circular HSS, etc.). The joists 701 and columns 702 may be comprising of a metal or metal alloy. For example, the install guide 730 may be comprised of steel, cast iron, aluminum alloy, or the like.

The primary compartment 700 includes a top panel 710 and a top panel opening 720. In some examples, the top panel opening 720 may be formed in the top panel 710. In other examples, the top panel 710 may only include a portion of the top of the primary compartment 700 and the top panel opening 720 may be a remaining portion of the top of the primary compartment 700 not covered by the top panel 710. The top panel opening 720 may be a rectangular or a substantially rectangular opening. In some examples, the top panel opening 720 may have a square shape. The primary compartment 700 further includes an install guide 730. The install guide 730 may be disposed around all of or a portion of the top panel opening 720. Specifically, the install guide 730 may be disposed around all or a portion of a perimeter of the top panel opening 720. In some examples, the install guide 730 may be disposed around three sides of the top panel opening 720. For example, the install guide 730 may be disposed along three sides of the top panel opening 720 disposed along a perimeter of the generator enclosure 600. In some examples. In other examples, the install guide may be disposed around two or all four sides of the top panel opening 720. For example, the install guide 730 may be disposed along two opposite sides of the top panel opening 720. In some examples, the install guide 730 may be disposed within the top panel opening (e.g., along the perimeter of and within the top panel opening).

In some examples, the install guide 730 may be integrally formed with one or more side panels 740 of the primary compartment or on or more beams forming the structure or frame of the primary compartment 700. In other examples, the install guide 730 may be attached (e.g., fastened, welded) to one or more side panels 740 of the primary compartment 700 or one or more beams forming the structure of the primary compartment 700. In some examples, the install guide 730 may be comprised of two or more separate legs 731 that are individually attached to the side panels 740, joists 701, and/or columns 702. For example, a separate leg 731 may be provided for each side of the top panel opening 720. The install guide 730 may be comprised of a metal or a metal alloy. For example, the install guide 730 may be comprised of steel, cast iron, aluminum alloy or the like. In some examples, the install guide 730 may be comprised of the same material as the side panels 740.

In some examples, the install guide 730, and each leg 731 of the install guide 730, may include a face 733 and a flange 734. The face 733 may extend vertically and parallel or substantially parallel to a corresponding (e.g., adjacent) side panel 740. The face 733 may be offset from an outer surface of the side panel 740, for example, inside the top panel opening 720, such that a ledge 735 is provided by a top surface of a side panel 740, a joist 701, and/or a column 702.

The expansion box 800 may have the shape of a rectangular prism or a substantially rectangular prism. The expansion box 800 includes a bottom opening 810. The bottom opening 810 may comprise all of, or nearly all, of a bottom surface of the expansion box 800. In some examples, side panels 840 of the expansion box 800 may define a shape of the bottom opening 810. The expansion box 800 may further include a permeable surface 880 (e.g., a vented surface) opposite the bottom opening 810. The permeable surface 880 may be configured to allow air to flow into the generator enclosure 600 to cool (i.e., reduce the temperature of) the genset. One or more fans may be used to draw air through the permeable surface 880 into the generator enclosure 600. Additionally, the expansion box 800 may provide additional space for one or more sound suppression elements, for example, air baffles 870, acoustic foam, and the like.

The bottom opening 810 may be configured to receive the install guide 730 of the primary compartment 700. Specifically, the bottom opening 810 may be configured to surround or circumscribe the install guide when the expansion box is installed on the primary compartment 700. In some examples, the bottom opening 810 may only be configured to receive the install guide 730 when the expansion box 800 is in a specific or correct position relative to the primary compartment 700. Accordingly, the install guide 730 may control a position of the expansion box 800 relative to the primary compartment 700.

In some examples, one or more notches or recesses in the install guide and one or more protrusions in the bottom opening 810 may be used to ensure that the bottom opening 810 receives the install guide 730 when the expansion box is in a specific or correct position relative to the primary compartment 700.

Figure 4:
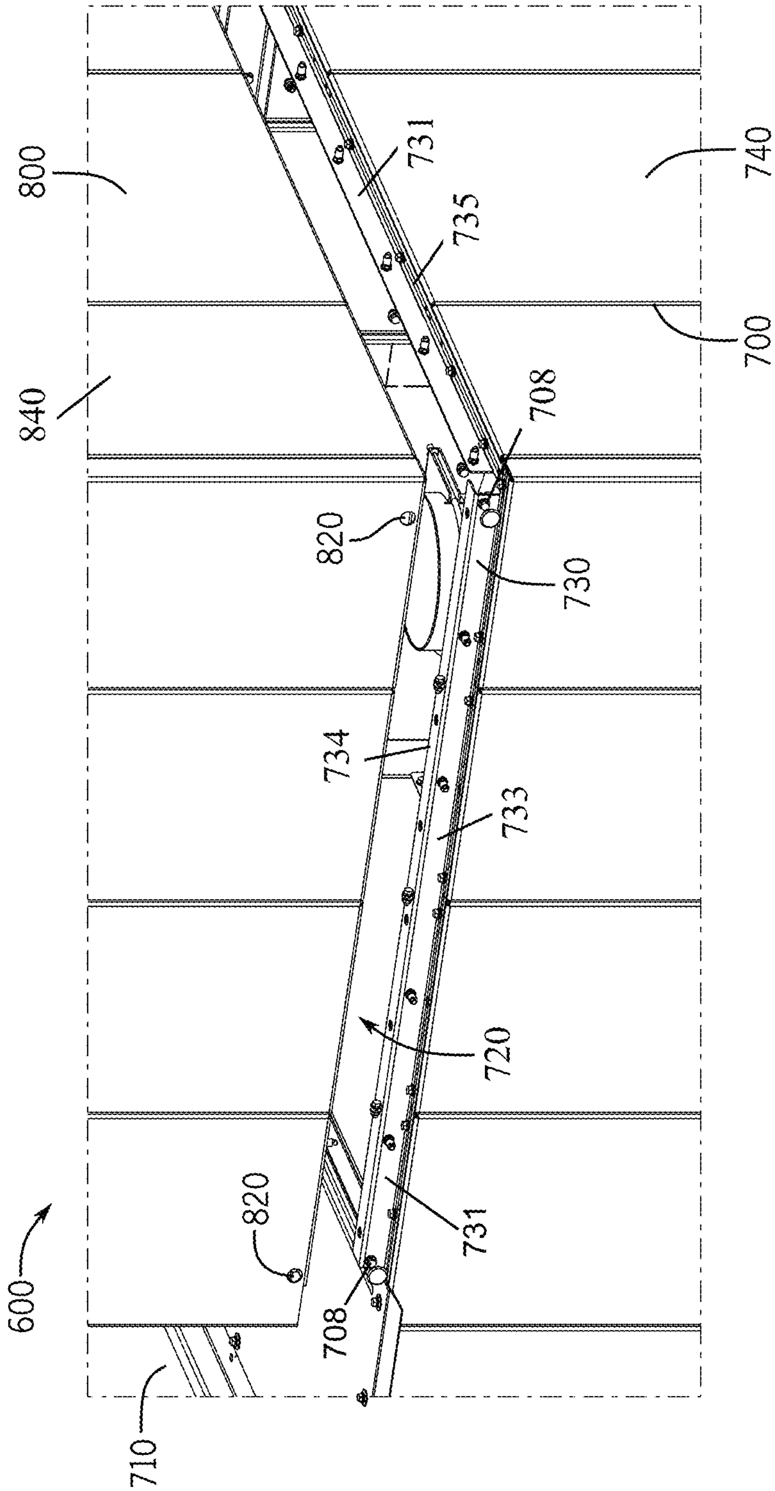
FIG. 4 illustrates a partial perspective view of a primary compartment and an expansion box of a generator enclosure according to an exemplary embodiment of the present disclosure.
Figure 5:
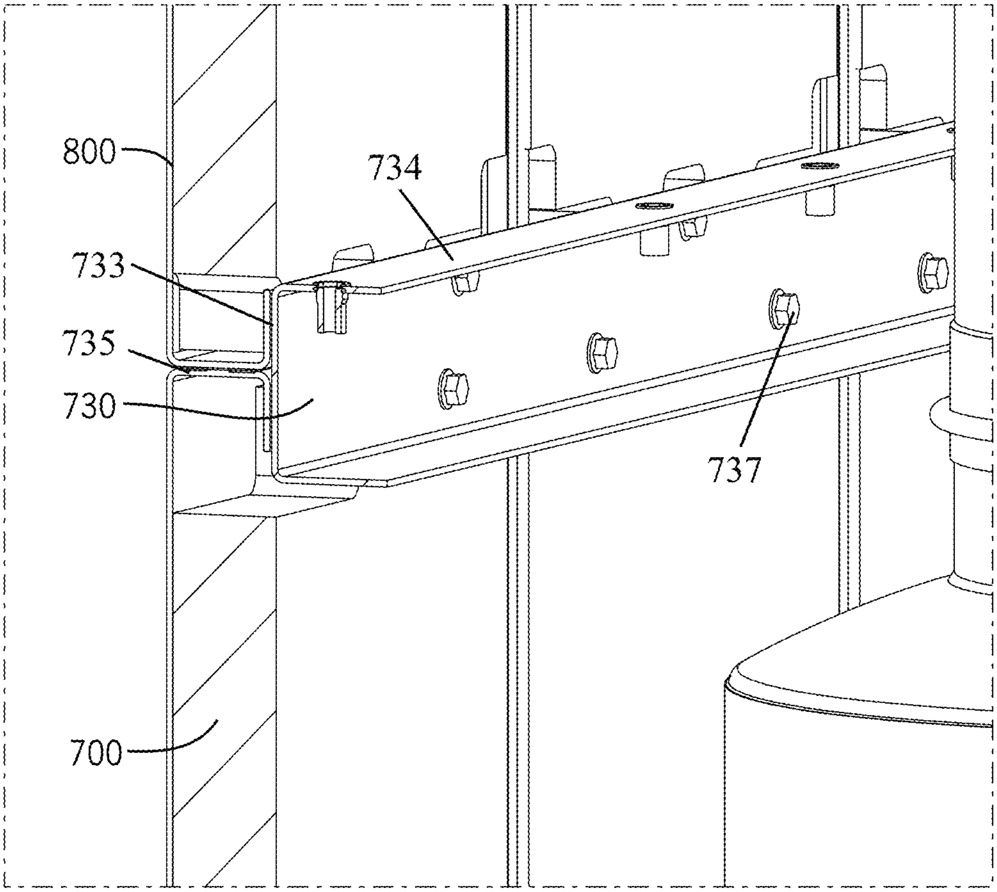
FIG. 5 illustrates a partial cross section view of a primary compartment, guide rails and an expansion box according to an exemplary embodiment of the present disclosure.

The expansion box 800 further includes a plurality of mounting holes 820 or expansion box mounting holes 820. The mounting holes may be configured to receive a fastener for attaching (e.g., securing, coupling) the expansion box 800 to the install guide 730 after the bottom opening 810 has received the install guide 730. The one or more mounting holes 820 may align with one or more guide mounting holes 708 disposed in the face 733 of the install guide 730. Each of the mounting holes 820 may receive a fastener such as a bolt, screw, stud, and the like, for attaching the expansion box 800 to the install guide 730 from the outside of the enclosure. The fastener may extend through each mounting hole 820 and the install guide 730, specifically, the guide mounting holes 708. In some examples, a nut and bolt may be used to secure the expansion box 800 to the install guide 730. For example, a nut 737 may be welded or otherwise integrally formed within the install guide 730. The number of mounting holes 820 may vary. In some examples, four mounting holes 820 may be used. In other examples, two, six, or eight mounting holes 820 may be used. The number of mounting holes 820 may correspond to the number of guide mounting holes 708. In some examples, a mounting hole 820 may be provided at or near each end of a side of the expansion box 800, as illustrated in FIG. 4.

The expansion box 800 may further include an air discharge pipe 860 (i.e., an exhaust pipe). The air discharge pipe 860 may be connected to the engine of the genset and may discharge exhaust gas from the engine to the exterior of the generator enclosure 600. In some embodiments, the expansion box 800 may further include an air intake pipe. The air intake pipe may be connected to and supply air to the engine of the genset.

In some embodiments, the expansion box 800 may further include air baffles 870. The air baffles 870 may be configured to reduce the or dampen the noise generated during operation of the genset. The air baffles 870 may be an open cell foam. For example, the air baffles may be comprised of acoustic foam such as expanded polyethylene.

Figure 7:
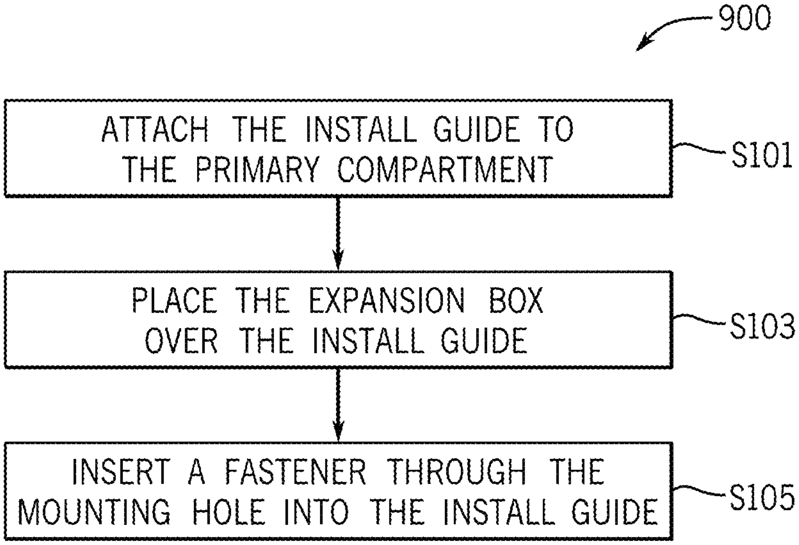
FIG. 7 illustrates a flow chart for a method assembling a generator enclosure according to an exemplary embodiment of the present disclosure.

FIG. 7 illustrates a method 900 for assembling a generator enclosure 600 according to an exemplary embodiment of the present disclosure. The method 900 may be used to assemble the various generator assemblies described herein. Additional, different, or fewer acts may be provided. The method 900 is described with respect to the generator enclosure 600 as illustrated in FIGS. 3-6.

At act S101, the install guide 730 is attached to the primary compartment 700. In some examples, the install guide 730 may be integrally formed with one or more side panels 740 and/or one or more beams comprising the primary compartment 700 and this act may be omitted. In other examples, the install guide 730 may be attached to the primary compartment (e.g., side panels 740, joists 701, and/or columns 702) using a fastener, such as a bolt, stud, rivet, or the like. In other embodiments, the install guide 730 may be welded to the primary compartment 700. In yet other examples, the install guide may be attached to the primary compartment 700 using adhesive tape.

The install guide 730 may be attached to the primary compartment 700 along one or more sides of the top panel opening 720 of the primary compartment 700. The size and shape of the top panel opening 720 may vary. In some examples, the install guide 730 may extend along or around a single side of the top panel opening 720. In other examples, for instance when the top panel opening 720 is rectangular, the install guide may be disposed around one, two, three, or four sides of the top panel opening 720.

At act S103, the expansion box 800 is placed over the install guide 730. Act S103 may further include aligning the bottom opening 810 of the expansion box 800 with the install guide 730. The flange 734 of the install guide 730 may be configured to assist alignment of the bottom opening 810 with the install guide 730. The expansion box 800 may be placed over the install guide 730 such that the install guide 730 is received and remains disposed within the bottom opening 810 of the expansion box 800. The shape of the bottom opening 810 may vary. The shape of the bottom opening 810 may be the same or substantially similar to the shape of the top panel opening 720. When the expansion box 800 is placed over the install guide 730, the expansion box 800 may abut the ledge 735. Additionally, the install guide may abut the expansion box 800 along an interior surface of the bottom opening 810. When the expansion box 800 is placed over the install guide, the one or more mounting holes 820 in the expansion box 800 may align with the one or more guide mounting holes 708 formed in the install guide 730.

At act S103, a fastener is inserted through the mounting hole 820 and into the install guide 730. The fastener may be installed from the outside of the enclosure. Installation of the fastener from an outside of the enclosure may advantageously reduce the risk of injury during construction or manufacturing of the enclosure 600, by allowing the entire assembly to be performed outside the enclosure 600. The fastener may be for example a bolt, stud, rivet, or the like. The fastener may be inserted through the mounting hole 820 and into a guide mounting hole 708 formed in the install guide 730, attaching (e.g., securing) the expansion box 800 to the primary compartment 700. The number of fasteners used may vary. In some examples, four fasteners may used. In other examples, six or eight fasteners may be used. The one or more holes formed in the install guide may be threaded and a fastener, such as a bolt, may rotated into the hole formed in the install guide. In other examples, a threaded insert, weld nut, or threaded plate may be attached to the install guide, and the fastener may be rotated into the threaded insert, weld nut, or threaded plate.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

When a component, element, device, or the like of the present disclosure is described as having a purpose or performing an operation, function, or the like, the component, device, or element should be considered herein as being "configured to" meet that purpose or to perform that operation or function.

What is claimed is:

1. A generator enclosure assembly, comprising:
- a generator enclosure including an engine and an alternator;
- a first beam disposed below the generator enclosure and supporting the generator enclosure;
- a second beam disposed below the generator enclosure and supporting the generator enclosure; and
- a pedestrian support for the generator enclosure including:
  - a body, including:
    - a first end,
    - a second end,
    - a first longitudinal side intermediate the first end and the second end,
    - a second longitudinal side intermediate the first end and the second end,
  - a first bearing plate extending from the first end,
  - a second bearing plate extending from the second end, the first bearing plate attached to the first beam and the second bearing plate attached to the second beam, wherein the first beam and the second beam are adjacent to one another without another beam disposed therebetween,
  - a first sidewall extending downwardly from the first longitudinal side intermediate the first beam and the second beam, and
  - a second sidewall extending downwardly from the second longitudinal side intermediate the first beam and the second beam,
  - wherein the first sidewall comprises opposing ends, wherein the second sidewall comprises opposing ends, wherein the first bearing plate extends longitudinally from an end of the first sidewall and an end of the second sidewall, and wherein the second bearing plate extends longitudinally from an end of the first sidewall and an end of second sidewall.

2. The generator enclosure assembly of claim 1, further comprising a fuel tank disposed below the first beam and the second beam.

3. The generator enclosure assembly of claim 1, wherein the first bearing plate is attached to a top flange of the first beam, and wherein the second bearing plate is attached to a top flange of the second beam.

4. The generator enclosure assembly of claim 1, wherein the pedestrian support comprises two or more pedestrian supports each including a body, a first bearing plate, and a second bearing plate, the first bearing plate attached to one beam and the second bearing plate attached to another beam, different than the one beam.

5. The generator enclosure assembly of claim 1, further comprising:
- a textured surface disposed on a top surface of the body.

6. The generator enclosure assembly of claim 1, wherein the first bearing plate and the second bearing plate are attached to the first beam and the second beam, respectively, using an adhesive tape.

7. The generator enclosure assembly of claim 1, wherein the first bearing plate and the second bearing plate are attached to the first beam and the second beam, respectively, using one or more fasteners.

8. A pedestrian support for a generator enclosure, the pedestrian support comprising:
- a body configured to support a pedestrian and provide access to the generator enclosure, the body including: an elongate length;
  - a first end and a second end at opposite ends of the elongate length; and
  - a first longitudinal side and a second longitudinal side extending along opposite sides of the elongate length;
- a first bearing plate extending longitudinally from the elongate length at the first end, the first bearing plate being configured to support the body;
- a second bearing plate extending longitudinally from the elongate length at the second end, the second bearing plate being configured to support the body;
- a first sidewall extending downwardly from the first longitudinal side along the elongate length; and
- a second sidewall extending downwardly from the second longitudinal side along the elongate length,
- wherein the first sidewall comprises opposing ends, wherein the second sidewall comprises opposing ends, wherein the first bearing plate extends longitudinally from an end of the first sidewall and an end of the second sidewall, and wherein the second bearing plate extends longitudinally from an end of the first sidewall and an end of second sidewall.

9. The pedestrian support of claim 8, wherein the first bearing plate is configured to be attached to a first beam disposed below a generator enclosure, and wherein the second bearing plate is configured to be attached to a second beam disposed below the generator enclosure.

10. The pedestrian support of claim 9, wherein the first bearing plate is configured to be attached to a top flange of the first beam, and wherein the second bearing plate is configured to be attached to a top flange of the second beam.

11. The pedestrian support of claim 10, wherein the first bearing plate is configured to be attached to the top flange of the first beam using an adhesive tape, and wherein the second bearing plate is configured to be attached to the second beam using the adhesive tape.

12. The pedestrian support of claim 8, further comprising:
- a textured surface disposed on a top surface of the body.

13. The pedestrian support of claim 8, wherein the body, first bearing plate, and second bearing plate are integrally formed.

14. A pedestrian support for a generator enclosure, the pedestrian support comprising:
- a body configured to support a pedestrian and provide access to the generator enclosure, the body including: an elongate length;
  - a first end and a second end at opposite ends of the elongate length; and
  - a first longitudinal side and a second longitudinal side extending along opposite sides of the elongate length;
- a first bearing plate extending longitudinally from the elongate length at the first end, the first bearing plate being configured to support the body;
- a second bearing plate extending longitudinally from the elongate length at the second end, the second bearing plate being configured to support the body;

a first sidewall extending downwardly from the first longitudinal side along the elongate length; and a second sidewall extending downwardly from the second longitudinal side along the elongate length, wherein the first sidewall does not extend alongside the first bearing plate and the second bearing plate, and wherein the second sidewall does not extend alongside the second bearing plate.

15. The pedestrian support of claim 14, wherein the first bearing plate is configured to be attached to a first beam disposed below a generator enclosure, and wherein the second bearing plate is configured to be attached to a second beam disposed below the generator enclosure.

16. The pedestrian support of claim 15, wherein the first bearing plate is configured to be attached to a top flange of the first beam, and wherein the second bearing plate is configured to be attached to a top flange of the second beam.

17. The pedestrian support of claim 16, wherein the first bearing plate is configured to be attached to the top flange of the first beam using an adhesive tape, and wherein the second bearing plate is configured to be attached to the second beam using the adhesive tape.

18. The pedestrian support of claim 14, further comprising:

a textured surface disposed on a top surface of the body.

19. The pedestrian support of claim 14, wherein the body, first bearing plate, and second bearing plate are integrally formed.

* * * * *